United States Patent [19]
Chen

[11] Patent Number: 5,925,849
[45] Date of Patent: Jul. 20, 1999

[54] FLOOR MOUNTED UTILITY BOX

[75] Inventor: Wen-Ten Chen, Chung-ho, Taiwan

[73] Assignee: Taiwan Semiconductor Manufacturing Co. Ltd., Hsin-chu, Taiwan

[21] Appl. No.: 08/986,182

[22] Filed: Dec. 5, 1997

[51] Int. Cl.⁶ ...................................................... H02G 3/04
[52] U.S. Cl. ................................ 174/48; 174/53; 174/58; 220/3.3; 220/3.94
[58] Field of Search ................................... 174/48, 50, 53, 174/55, 57, 58, 67, 66; 220/3.3, 3.92, 3.8, 3.94, 242, 200, 241

[56] References Cited

U.S. PATENT DOCUMENTS

| | | | |
|---|---|---|---|
| 1,142,835 | 6/1915 | Murray | 174/71 R |
| 1,271,478 | 2/1918 | Krantz | 439/138 |
| 1,499,788 | 7/1924 | Seltzer | 174/53 |
| 1,857,079 | 5/1932 | Cook | 174/53 |
| 2,996,566 | 8/1961 | Stas | 174/53 |

*Primary Examiner*—Kristine Kincaid
*Assistant Examiner*—Dhiru R Patel
*Attorney, Agent, or Firm*—Tung & Associates

[57] ABSTRACT

The present invention provides a floor mounted utility box that utilizes a cover member which can be easily installed by dropping in without any fastening means when in an installed position, the cover member is substantially flush with the floor level such that no tripping hazard is created by the cover. The cover is supported by at least two spaced apart supporting legs to provide a stabilizing effect for the cover.

20 Claims, 2 Drawing Sheets

FLOOR MOUNTED UTILITY BOX

FIELD OF THE INVENTION

The present invention generally relates to an electrical power outlet apparatus for mounting in a floor and more particularly, relates to a floor mounted utility box that has a cover flush with the floor when installed on the box such that it does not present any tripping hazard and is easy to maintain.

BACKGROUND OF THE INVENTION

In a manufacturing facility, the availability of electrical power through a utility box on the plant floor is essential. The electrical power outlets must be readily available at various locations in the plant such that any auxiliary equipment, cleaning equipment or other processing equipment can be plugged in. The electrical utility boxes are normally mounted either on support columns or in the floor. The floor mounted utility boxes are more commonly used since they are independent from the support column locations and therefore can be mounted anywhere desired. The availability of utility boxes is especially important in semiconductor fabrication facilities such that electricity can be readily supplied to auxiliary equipment that are frequently necessary in the fabrication of semiconductor chips.

A conventional floor mounted utility box is constructed of a body and a cover. In the body of the utility box, a cavity is provided which houses an electrical socket adapted for receiving electrical plugs. The body is mounted in a recess provided in the floor such that the body does not protrude above the floor level. A typical conventional floor mounted utility box is shown in FIG. 1A in a perspective view. The floor mounted utility box 10 consists of a body 12 and a cover 14. The cover 14 is designed such that access holes 16 are provided under the cover 14 to provide room for the wiring. In the conventional utility box 10, the cover 14 has a curved top wherein a high point 20 in the curved top provides wiring access holes 16.

FIG. 1B shows a top view of the body 12 of the conventional utility box 10. In the body 12, a slot opening 24 is provided at the tip of the body such that a cover may be latched thereinto. The body 12 has a cavity 26 which is formed vertically with the top surface 28 of the body 12. The cavity 26 has a dimension of approximately 4 inches wide, 3 inches long and 1½ inches deep. On the sidewall 30 of the cavity 26, an electrical socket 32 is provided which is adapted to receive at least two electrical plugs. Fastening means such as screws 34 are provided for fastening the top cover 28 to the body 12. Access holes 16 are also provided to allow the wiring to go through when electrical plugs (not shown) are plugged into the socket 32.

FIG. 1C shows a side view of the conventional floor mounted utility box 10 wherein the curved cover 14 is shown with a hump 20 over the access hole 16. The cover 14 is mounted to the body 12 by a latch 38 which is latched into the slot opening 24 provided in the body 12. At the opposite end of the cover 14, and on top of the hump 20, a mounting hole 22 is provided for a bolt 40 to go through and fasten to the body 12. FIG. 1D is a top view of the conventional floor mounted utility box 10 showing the top cover 14 mounted on the body 12 with bolt 40.

The conventional floor mounted utility box 10 shown in FIGS. 1A–1D has several drawbacks and disadvantages for its practical use in a fabrication facility. First, the curved top with the hump portion presents a serious tripping problem in a fabrication plant. Plant personnel when walking over the cover may be tripped by the curved cover and thus causing injuries in a trip and fall situation. The humped portion on the curve cover may further cause problems to vehicles when a wheel of the vehicle goes over the hump resulting in an unbalanced state. When installing the cover, the curved cover 14 must first be carefully latched into the body 12 at one end and then at the other end, a bolt must be used to fasten the cover to the body. This is a tedious process and as a result, the cover is frequently not replaced on top of the utility box by the plant personnel and thus leaving the utility box open. An open top utility box can cause more serious problems such as personnel tripping over it and utility vehicles tipping over by hitting the cavity in the utility box and thus be unbalanced.

It is therefore an object of the present invention to provide a floor mounted utility box that does not have the drawbacks and shortcomings of the conventional floor mounted utility boxes.

It is another object of the present invention to provide a floor mounted utility box that can be mounted in a floor and be completely flush with the floor surface.

It is a further object of the present invention to provide a floor mounted utility box that has a cover which is completely flushed with the floor level when mounted to the box.

It is another further object of the present invention to provide a floor mounted utility box which has a cover that can be easily mounted to the box without fastening means.

It is yet another object of the present invention to provide a floor mounted utility box which has a cover that is flush with the floor level when mounted and is supported by support legs capable of withstanding at least 100 kilogram load.

It is still another object of the present invention to provide a floor mounted utility box which has a cover that can be easily mounted to the box by a simple drop-in operation.

It is yet another further object of the present invention to provide a floor mounted utility box that can be easily maintained.

It is still another further object of the present invention to provide a floor mounted utility box which uses a cover that can be easily replaced inexpensively.

SUMMARY OF THE INVENTION

In accordance with the present invention, a floor mounted utility box that utilizes a cover which when installed is completely flush with the floor the box is recessed in and that the cover can be easily replaced after an electrical plug is plugged into or unplugged from the utility box.

In a preferred embodiment, an electrical power outlet apparatus for mounting in a floor is provided which includes a cylindrical body member and a cover insert member, the cylindrical body member has a cavity and an electrical socket in the cavity adapted for receiving an electrical plug for connecting to the socket, the cover insert member is removably mounted to the cylindrical body member to substantially conceal the cavity in the cylindrical body member, the cover insert member portion is equipped with integrally formed supporting legs for abutting against a bottom surface of the cavity when the cover insert member is in a mounted position such that when the cylindrical body member is recessed in a floor, the top surface of the cover insert member is flush with the floor.

In another preferred embodiment, a floor mounted utility box is provided which includes a cylindrical body member that has a cavity therein extending vertically from a top surface downwardly to a depth sufficient for mounting an electrical outlet and for accepting at least one electrical plug and wiring, the cylindrical body member is adapted for recess mounting in a floor, and a cover insert member which includes a rigid plate and at least two legs integral with the plate extending outwardly from the plate in a perpendicular direction, the cover insert member is adapted for removably mounting to the cylindrical body member to substantially conceal the cavity with the at least two legs contacting a bottom surface in the cavity and a top surface of the cover portion substantially flush with a surface of the floor.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a floor mounted utility box that utilizes a cover which when in an installed position is completely flushed with the floor in which the utility box is recess mounted. The cover can be installed on the utility box without the use of any fastening means by simply dropping the cover into the box. The present invention novel utility box and specifically its novel cover can be easily replaced when it is misplaced or lost at low cost by simply dropping in another cover.

Figure 1A:
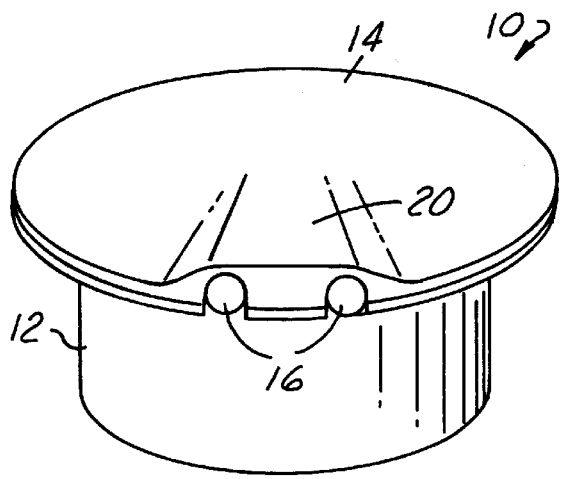
FIG. 1A is a perspective view of a conventional floor mounted utility box having a cover and a body.
Figure 1B:
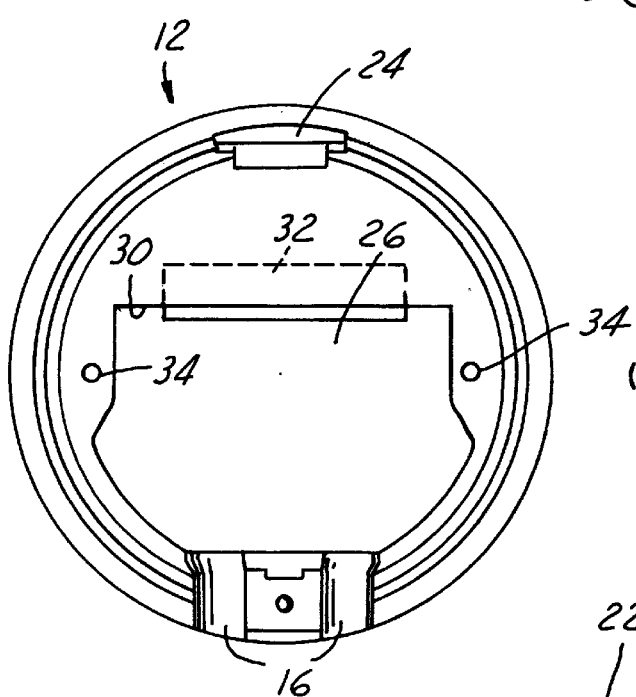
FIG. 1B is a top view of the conventional floor mounted utility box of FIG. 1A without the cover installed thereon.
Figure 1C:
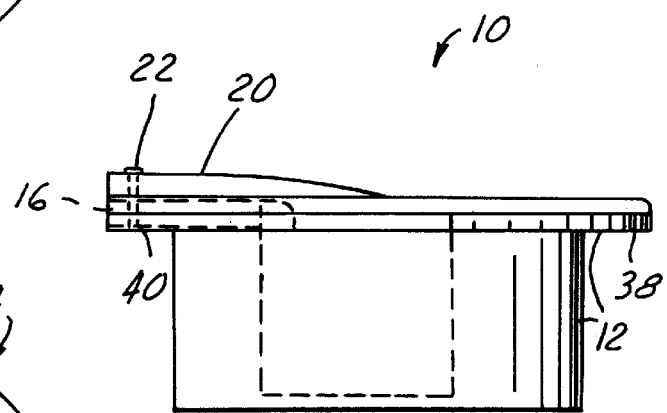
FIG. 1C is a side view of the conventional floor mounted utility box of FIG. 1A with the cover mounted on the body.
Figure 1D:
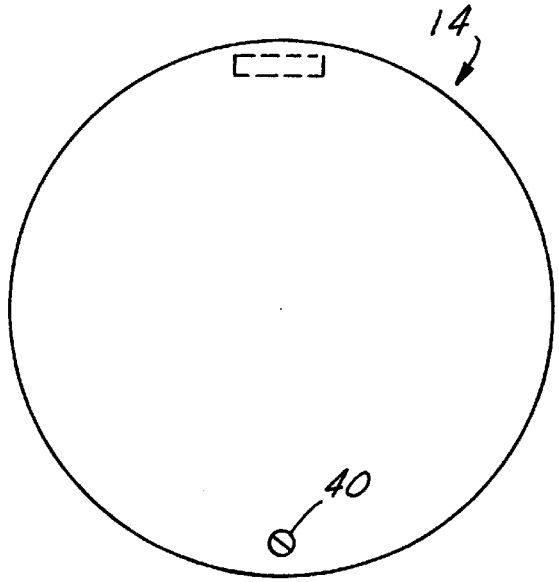
FIG. 1D is a top view of the conventional floor mounted utility box of FIG. 1A with the cover installed thereon.
Figure 2A:
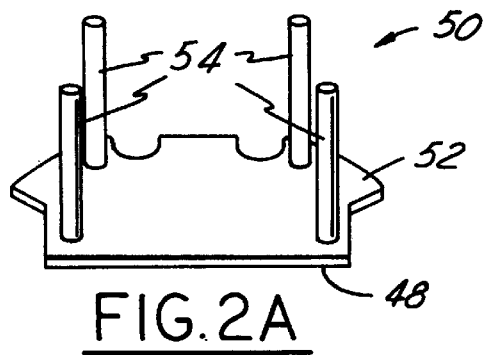
FIG. 2A is a perspective view of a present invention cover for a floor mounted utility box.
Figure 2B:
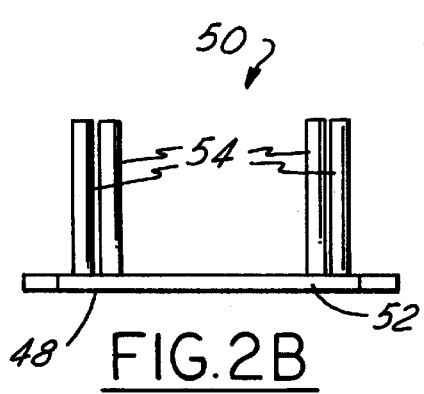
FIG. 2B is a side view of the cover shown in FIG. 2A.
Figure 2C:
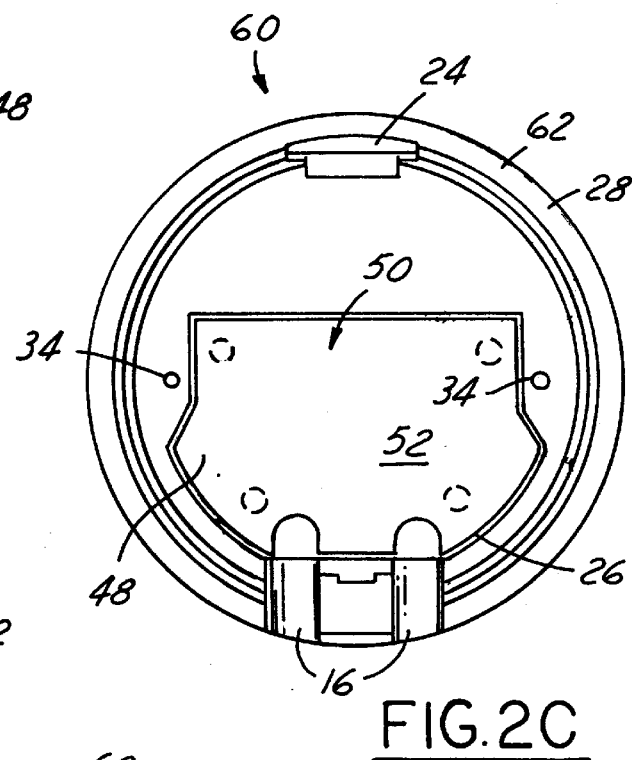
FIG. 2C is a top view of the present invention floor mounted utility box having the cover mounted on the body.

Referring initially to FIG. 2A, where it is shown a perspective view of a present invention cover insert member 50 for a floor mounted utility box 60 (shown in FIG. 2C). The cover insert member 50 shown in FIG. 2A is constructed by a substantially flat rigid plate 52 which is stamped out of a rigid steel plate. At least two, four are shown in FIG. 2A, supporting legs 54 are formed integrally with the rigid plate 52. The forming method can be conveniently a welding method during which the bottom end of the leg 54 is welded to the flat plate 52. After the welding process, the cover insert member 50 is of a unitary one piece construction. FIG. 2B is a side view of the cover insert member 50 shown in FIG. 2A. It is seen that the supporting legs 54 are formed, i.e., welded, to the rigid plate in a substantially vertical position. The length of the supporting legs 54 should be approximately equal to the depth of the cavity 26 in the cylindrical body member 62 of the utility box 60. A suitable depth is normally approximately 1.5 inches or any other suitable depths desired. The size of the cover insert member 50 should be slightly smaller than the cross-sectional area of the cavity 26 such that it can be fitted snugly in the cavity. This is shown in FIG. 2C.

When the cover insert member 50 is properly mounted in the cavity 26 of the cylindrical body member 62, the top surface 48 of the rigid plate 52 should be flush with the top surface 28 of the cylindrical body member 62. This can be achieved by carefully selecting the length of the supporting legs 54 to be approximately equal to the depth of the cavity 26. The number of the supporting legs 54 required may be suitably selected as four, or any other numbers desired. For instance, three supporting legs may adequately perform the necessary support function of the rigid plate 52. It has been found that typically the cover insert member 50 should be able to carry a load of at least 100 kilograms without deformation or collapsing. This simulates the weight of a plant personnel walking on the plate or the weight of a vehicle driving over the plate.

Figure 2D:
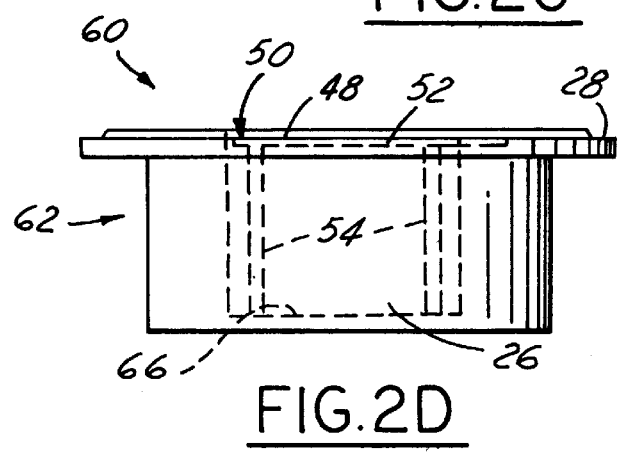
FIG. 2D is a side view of the present invention floor mounted utility box having the cover mounted on the body.

FIG. 2D is a side view of the present invention floor mounted utility box in an assembled position. It is seen that the length of the supporting legs 54 is sufficient to abut the bottom surface 66 of the cavity 26. This provides a solid support for the rigid plate 52 when it is in a mounted position.

The present invention novel floor mounted utility box is therefore amply demonstrated by the above descriptions and the appended drawings of FIGS. 2A–2D. It should be noted that the present invention utility box provides significant benefits that were not achievable by the conventional utility boxes. For instance, the cover insert member can be easily installed on the utility box without any fastening means, i.e., the cover insert member can be simply dropped into the utility box. Moreover, the cover insert member can be inexpensively manufactured and therefore easily replaced. The supporting legs used on the present invention cover insert member provide the stabilizing effect such that the cover insert member can be mounted securely in the cavity of the utility box without significant movements.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. An electrical power outlet apparatus for mounting in a floor comprising:

a cylindrical body member and a cover insert member, said cylindrical body member having a cavity and an electrical socket therein adapted for receiving an electrical plug for connecting to said socket, said cover insert member removably mounted to said cylindrical body member substantially concealing said cavity in said cylindrical body member, said cover insert member being equipped unitarily with at least two supporting legs for abutting against a bottom surface of said cavity when the cover insert member is mounted to said cylindrical body member and, when said cylindrical body member is mounted in a floor, a top surface of said cover insert member is flush with the floor.

2. An electrical power outlet apparatus according to claim 1, wherein said at least two supporting legs are four supporting legs formed spaced apart and integrally with said cover insert member extending in a perpendicular direction form said cover insert member.

3. An electrical power outlet apparatus according to claim 1, wherein said cover insert member is removably mounted to said cylindrical body member by dropping into said cylindrical body member and supporting the cover insert member by contacting said bottom surface in the cavity with said at least two supporting legs.

4. An electrical power outlet apparatus according to claim 1, wherein said cover insert member comprises a substantially planar plate and said at least two supporting legs formed integrally with the plate.

5. An electrical power outlet apparatus according to claim 1, wherein said electrical socket mounted in said cavity is adapted for receiving two electrical plugs.

6. An electrical power outlet apparatus according to claim 1, wherein said cover insert member is fabricated of steel.

7. An electrical power outlet apparatus according to claim 1, wherein said cavity in said cylindrical body member is formed in a dimension of at least 3 inches in width and length and at least 1 inch in depth.

8. An electrical power outlet apparatus according to claim 1, wherein said top surface of said cover insert member when mounted to said cylindrical body member in a floor is sufficient to carry a load of at least 100 Kg substantially without deformation.

9. An electrical power outlet apparatus according to claim 1, wherein said apparatus is mounted in a semiconductor fabrication plant.

10. A floor mounted utility box comprising:
- a cylindrical body member having a cavity therein extending vertically from a top surface downwardly to a depth sufficient for mounting an electrical outlet and for receiving at least one electrical plug, said cylindrical body member adapted for recessed mounting in a floor, and
- a cover insert member comprises a rigid plate and at least two legs integral with said plate extending outwardly from said plate in a perpendicular direction, said cover portion adapted for removably mounting to said cylindrical body member to substantially concealing said cavity with said at least two legs contacting a bottom surface of said cavity and a top surface of the cover insert member substantially flush with a surface of the floor.

11. A floor mounted utility box according to claim 10, wherein said cover insert member is fabricated of steel.

12. A floor mounted utility box according to claim 10, wherein said at least two legs formed integrally with said rigid plate are welded to said plate.

13. A floor mounted utility box according to claim 10, wherein said rigid plate having a rigidity sufficient to support a load of at least 100 Kg.

14. A floor mounted utility box according to claim 10, wherein said at least two legs are four legs integrally formed with said rigid plate and sufficiently spaced apart such that any load positioned on said plate are carried substantially equally by said four legs.

15. A floor mounted utility box according to claim 14, wherein said four legs extending in a perpendicular direction outwardly from said rigid plate.

16. A floor mounted utility box according to claim 14, wherein said four legs are integrally formed with said rigid plate by a welding method.

17. A floor mounted utility box according to claim 14, wherein said rigid plate is substantially planar.

18. A floor mounted utility box according to claim 14, wherein said cover insert member is removably mounted to said cylindrical body member by dropping into said cylindrical body member until said at least two legs contacting said bottom surface of said cavity.

19. A floor mounted utility box according to claim 10, wherein said electrical outlet is adapted for uniting with two electrical plugs.

20. A floor mounted utility box according to claim 10, wherein said utility box is mounted in the floor of a semiconductor fabrication facility.

* * * * *